(12) United States Patent
Ruszkowski, Jr.

(10) Patent No.: US 7,097,136 B2
(45) Date of Patent: Aug. 29, 2006

(54) IMMERSIBLE UNMANNED AIR VEHICLE AND SYSTEM FOR LAUNCH, RECOVERY, AND RE-LAUNCH AT SEA

(75) Inventor: Robert A. Ruszkowski, Jr., Keller, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 92 days.

(21) Appl. No.: 10/823,434

(22) Filed: Apr. 13, 2004

(65) Prior Publication Data

US 2005/0230535 A1   Oct. 20, 2005

(51) Int. Cl.
*B64C 35/00* (2006.01)

(52) U.S. Cl. ..................................... 244/105
(58) Field of Classification Search ............... 244/49, 244/58, 2, 105, 100 A, 53 B, 139
See application file for complete search history.

(56) References Cited

U.S. PATENT DOCUMENTS

| | | | |
|---|---|---|---|
| 2,431,132 A | | 11/1947 | Malina et al. ............... 244/63 |
| 2,506,976 A | | 5/1950 | Tharratt .................... 244/74 |
| 2,837,300 A | | 6/1958 | Sullivan ..................... 244/7 |
| 2,887,055 A | * | 5/1959 | Bagdanovich et al. ..... 244/3.27 |
| 2,981,499 A | * | 4/1961 | Janney, II ................. 244/2 |
| 3,074,321 A | | 1/1963 | Draim et al. .............. 89/1.7 |
| 3,152,779 A | | 10/1964 | Handler .................... 244/63 |
| 3,297,280 A | * | 1/1967 | Shao-Tang Lee ........... 244/105 |
| 3,301,132 A | * | 1/1967 | Lehmann et al. .......... 89/1.81 |
| 3,750,978 A | * | 8/1973 | Cunningham .............. 244/2 |
| 4,296,894 A | * | 10/1981 | Schnabele et al. ......... 244/3.27 |
| 4,471,923 A | * | 9/1984 | Hoppner et al. ........... 244/63 |
| 4,553,718 A | * | 11/1985 | Pinson ..................... 244/3.15 |
| 4,579,297 A | * | 4/1986 | Ayoola ..................... 244/2 |
| 4,667,899 A | * | 5/1987 | Wedertz ................... 244/49 |
| 4,744,301 A | * | 5/1988 | Cardoen ................... 102/393 |
| 4,844,380 A | * | 7/1989 | Peoples et al. ............ 244/3.22 |
| 5,529,263 A | * | 6/1996 | Rudolph ................... 244/55 |
| 5,615,847 A | | 4/1997 | Bourlett .................... 244/63 |
| 6,286,410 B1 | * | 9/2001 | Leibolt ..................... 89/1.809 |
| 6,290,174 B1 | | 9/2001 | Gioia ....................... 244/105 |
| 6,338,457 B1 | * | 1/2002 | Hilliard et al. ............. 244/139 |
| 6,592,073 B1 | | 7/2003 | Meekins ................... 244/105 |

FOREIGN PATENT DOCUMENTS

GB        WO 95/35236        12/1995

* cited by examiner

*Primary Examiner*—Tien Dinh
(74) *Attorney, Agent, or Firm*—Bracewell & Giuliani LLP

(57) ABSTRACT

A sea-launched and recovered unmanned aircraft is disclosed. The aircraft is jet-powered and has features and systems to maintain watertight integrity such that it may be released from a submerged submarine or dropped into a body of water by a ship or an aircraft. The aircraft is buoyant and remains at or near the water surface before its rockets are ignited. The rockets propel the air vehicle out of the sea and accelerate it to flying speed at which time a jet engine is started and the rockets are jettisoned. The air vehicle performs its mission independently or in conjunction with other ones of the air vehicles. The air vehicle then returns to an assigned splashdown point at sea via, for example, an engine-off "whip-stall" maneuver. A submarine or ship may retrieve the air vehicle and readies it for another mission.

20 Claims, 9 Drawing Sheets

IMMERSIBLE UNMANNED AIR VEHICLE AND SYSTEM FOR LAUNCH, RECOVERY, AND RE-LAUNCH AT SEA

BACKGROUND OF THE INVENTION

1. Technical Field

The present invention relates in general to an improved sea-based air vehicle system and, in particular, to an unmanned, jet-powered air vehicle that is capable of launch, recovery, and re-launch at sea without the need for a conventional flight deck (e.g., an aircraft carrier), wherein the air vehicle possesses specific features and systems to enable repeated water immersion for launch and recovery operations.

2. Description of the Related Art

Submarine-launched, unmanned air vehicles are well known in the prior art. For example, Regulas and Tomahawk missiles have been developed and deployed by the U.S. Navy. Another example includes WWII-era, Japanese I-Class submarines that were equipped with deck-mounted seaplane enclosures. These unique submarines would surface and the seaplanes would be removed from their watertight enclosures for assembly and launch. The float-equipped seaplanes would return to land in the water near the submarine, and would be recovered via a crane. After recovery, the seaplane was disassembled on-deck and returned to its watertight enclosure.

Regulas was a 1950's-era, U.S. submarine-launched missile system. Like the Japanese I-Class submarines, the Regulas missiles were carried in a deck-mounted, watertight enclosure aboard a specially-modified submarine. Once the submarine surfaced, the missiles were assembled and then launched using a disposable rocket booster. However, the Regulas missile was an expendable weapon system, and was not intended to be recovered by the launching submarine.

In the 1980's, the U.S. began using submarine-launched Tomahawk cruise missiles. A version of the Tomahawk cruise missile was developed for submerged launch from a submarine. The missile is ejected from the submarine using high pressure gas, and a rocket booster is used to broach the ocean surface and attain altitude and flying speed. Like Regulas, the jet-powered Tomahawk cruise missile is an expendable weapon system, and no provisions are made for recovery by a submarine. Although each of these prior art designs provides a solution for a specific sea-based application, an improved system for enabling a jet-powered air vehicle capable of launch, recovery, and re-launch at sea, without the need for a conventional flight deck, or from below the sea surface would be desirable.

SUMMARY OF THE INVENTION

One embodiment of a system, method, and apparatus for an unmanned jet-powered air vehicle is designed with specific features and systems to maintain watertight integrity such that it may be released from a submerged submarine or dropped into a body of water by a ship or an aircraft (i.e., air-dropped). The air vehicle remains buoyant in a nose-up attitude at the water surface until commanded to launch. It is also equipped with disposable rocket boosters to affect takeoff and attain altitude and flying speed. After attaining flying speed, the jet engine is started to maintain flight after rocket booster separation. The air vehicle then performs a mission such as attacking targets with onboard munitions or conducting reconnaissance.

Upon mission completion, the air vehicle returns to a designated recovery point at sea, shuts down its jet engine, and executes a splashdown (e.g., parachute-assisted). The air vehicle again relies upon specific features and systems to maintain watertight integrity and remain buoyant at the surface of the water while awaiting recovery by a submerged tending submarine or by a surface ship. After recovery, the air vehicle is refitted with rocket boosters, refueled, and reloaded with munitions (if needed) or with alternative payload (e.g., reconnaissance sensors) for subsequent missions. After refitting, the air vehicle may be immediately released into the water for another mission.

The present invention has a number of specific air vehicle features and systems to enable immersibility, including: (1) internal gas (e.g., nitrogen) pressurization system to offset/balance external hydrostatic water pressure loads; (2) jet engine inlet and nozzle close-off doors with watertight seals (e.g., inflatable seals); (3) watertight seals (e.g., inflatable seals) for any actuated doors (e.g., payload bay doors); (4) watertight sealant (e.g., silicon-based sealant) and/or appliqué tapes applied to manufacturing joints, seams, or other airframe penetrations; (5) syntactic foam-filling of selected aircraft voids; (6) exterior construction using materials and/or material coatings that resist saltwater corrosion.

The system of the present invention allows submarines as well as a variety of surface ships to operate jet-powered air vehicles for various purposes (e.g., conducting reconnaissance, weapon delivery, etc.) without the need for flight decks (e.g., an aircraft carrier) or submarine deck-mounted, watertight enclosures. In particular, the present invention allows a submarine to remain submerged throughout the launch, recovery, and re-launching phases of the reusable air vehicle operations. This design preserves the elements of stealth and surprise of the submarine, while providing an airborne sensor, communications, or weapon capability that may be operated at great ranges from the submarine.

Unlike expendable missile systems, the present invention allows repeated use of the sea-based, jet-powered air vehicle that may possess significant payload capabilities (e.g., 1,000 lb). Such payloads may comprise sophisticated sensors, communication systems, and/or weapons. As such, the present invention is more cost-effective than an expendable systems.

In one embodiment, the present invention comprises a submarine-launched and recovered multi-purpose unmanned air vehicle (MPUAV) equipped with specific systems to maintain watertight integrity (i.e., immersibility) as set forth in the present invention. For example, the MPUAV may be stowed, launched, and recovered into the OHIO-class "Trident" SSGN platform. The Trident contains Trident D-5 ballistic missile tubes that are converted to house and maintain the MPUAVs. The wings of an MPUAV are movable between a retracted storage position and an extended flying position to facilitate storage in the tube of the submarine. To launch an MPUAV, a tube is opened and the MPUAV is extended out of the tube on, for example, a mast mechanism. The MPUAV, which is buoyant, is released and its rockets are ignited. The rockets propel the MPUAV out of the sea and accelerate the MPUAV to flying speed. The jet engine of the MPUAV is started and the rockets are jettisoned.

The MPUAV performs its mission under jet power and can do so independently of or in conjunction with other MPUAVs. For example, an unarmed "lead" MPUAV may be used to image time-critical-targets and then transmit information to other MPUAV flight elements. The armed MPUAVs acquire their targets and release munitions, such as a low cost autonomous attack system (LOCAAS™), after receiving attack authorization. The LOCASS™ transmit position and attack intent to the lead MPUAV for relay back to the submarine. The lead MPUAV images the LOCAAS™ strike results, and battle damage assessment (BDA) information is simultaneously sent to the remaining armed MPUAVs and the submarine for follow-up attack. The submarine then launches other munitions, such as Tomahawk cruise missiles, at the remaining targets and the lead MPUAV again performs BDA.

When the mission is complete, the MPUAVs return to an assigned splashdown points at sea. The MPUAVs, which have no landing gear, may make their in-sea landings via several different methods including but not limited to parachutes or an engine-off "whip-stall" maneuver. The jet engine inlet and nozzle are sealed via watertight doors prior to splashdown. Upon landing, the MPUAV activates a sonar beacon, deploys a recovery cable, and awaits recovery by the submarine. The submarine has systems that reattach the MPUAV to its launch tube mast mechanism, which then retracts the MPUAV into the submarine. After the launch tube is purged of sea water, the MPUAV can be immediately readied for another mission.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
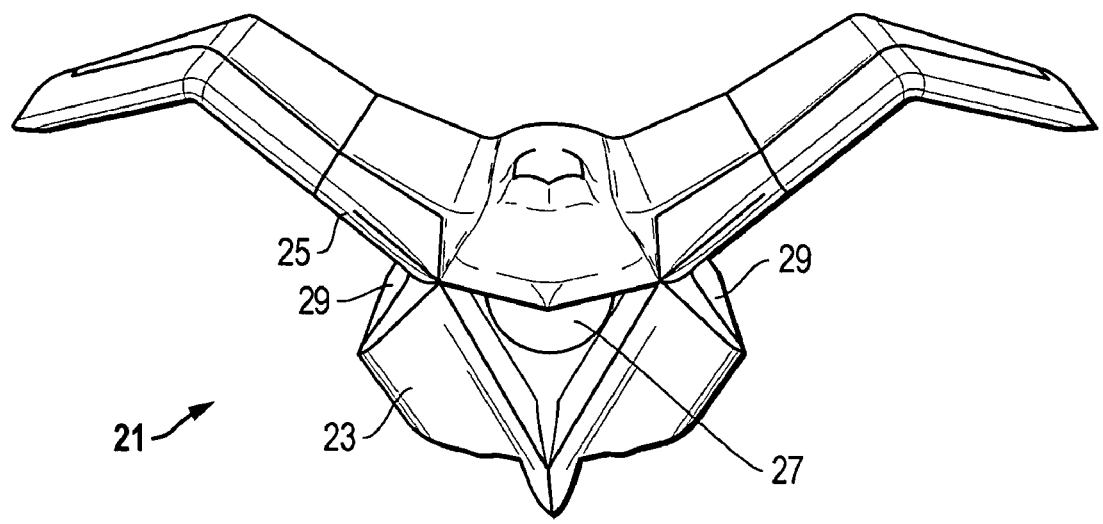
FIG. 1 is a front isometric view of an aircraft constructed in accordance with the present invention.
Figure 2:
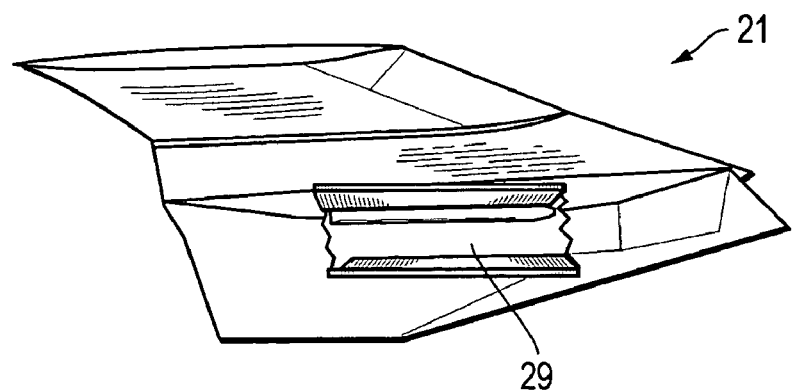
FIG. 2 is a diagram of the aircraft of FIG. 1 in operation.
Figure 2:

Referring to FIGS. 1–14, one embodiment of an aircraft 21 constructed in accordance with the present invention is shown. In the version illustrated, the aircraft 21 is an unmanned, reusable, sea-launched, and sea-retrieved, but does not required a flight deck to do so (e.g., an aircraft carrier). As shown in FIG. 1, the aircraft 21 comprises a body 23 having wings 25 and a jet engine 27 for sustaining flight. In the embodiment shown, the body 23 has two compartments 29 for carrying a payload 31 (FIG. 2).

Figure 3:
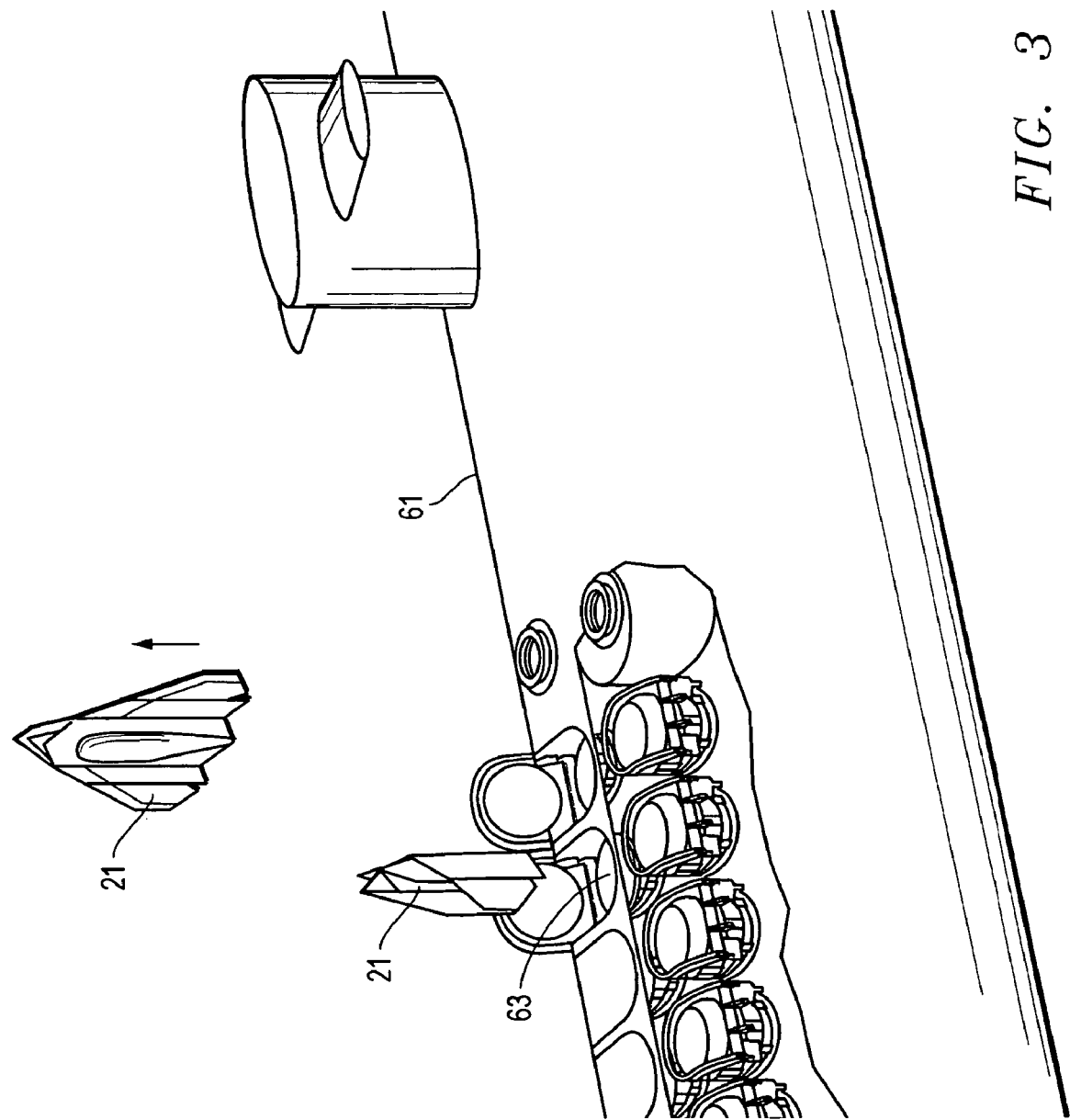
FIG. 3 is a diagram of the aircraft of FIG. 1 during pre-launch and retrieval operations.
Figure 4:
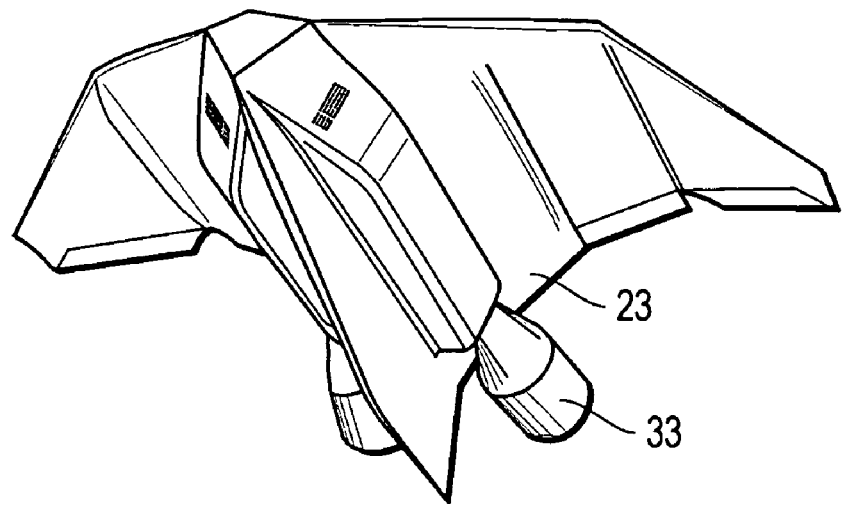
FIG. 4 is a diagram of the aircraft of FIG. 1 equipped with rocket boosters.
Figure 5:
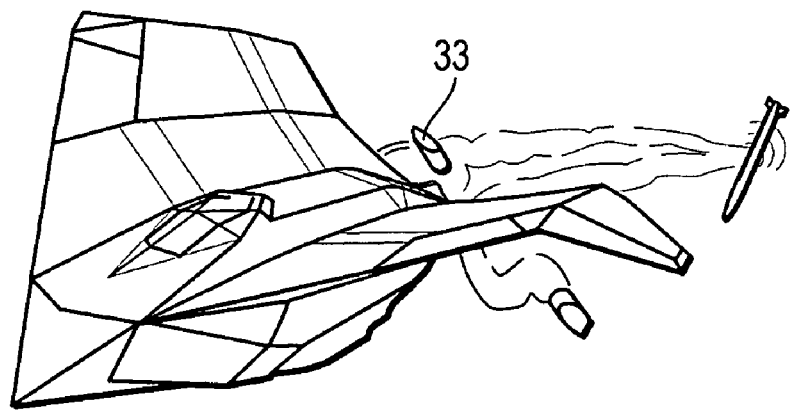
FIG. 5 is a diagram of the aircraft of FIG. 4 after release of the rocket boosters.
Figure 6:
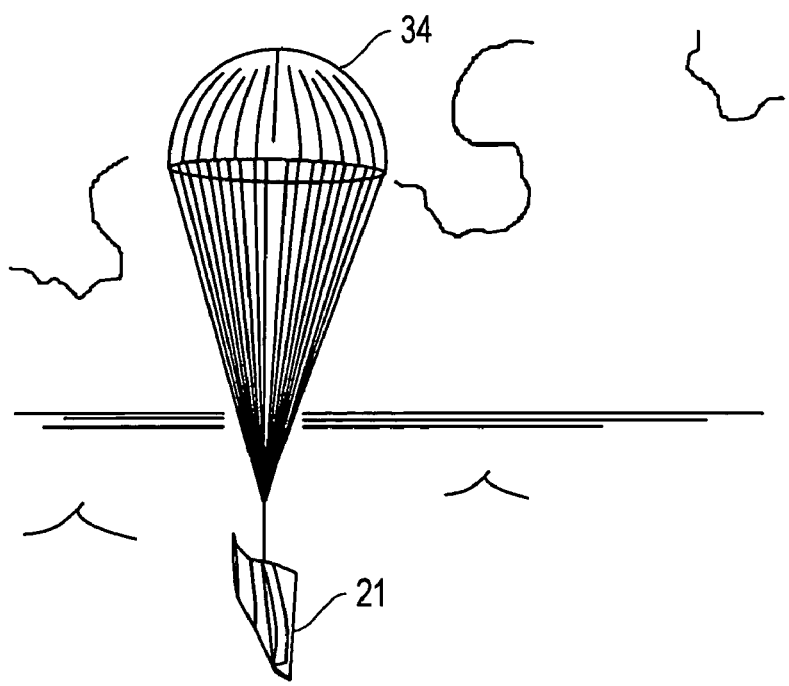
FIG. 6 is a diagram of the aircraft of FIG. 1 while executing one form of splashdown.
Figure 7:
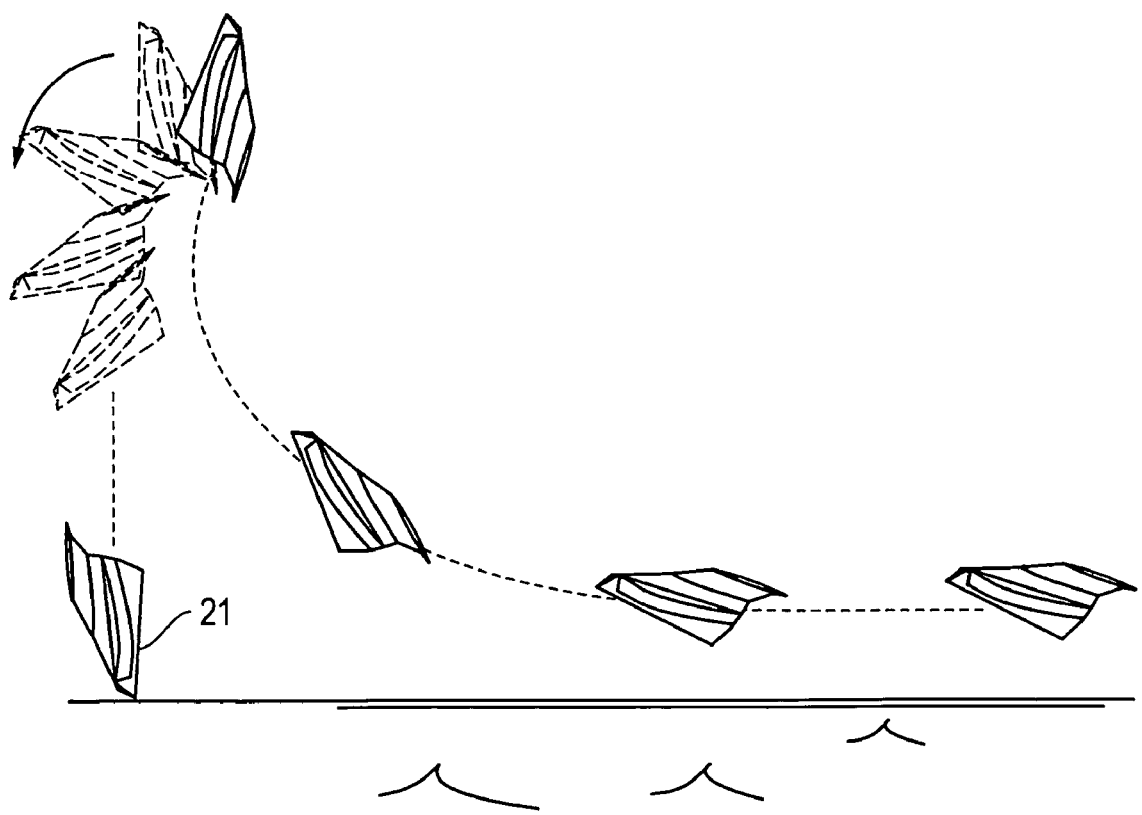
FIG. 7 is a diagram of the aircraft of FIG. 1 while executing another form of splashdown.
Figure 8:
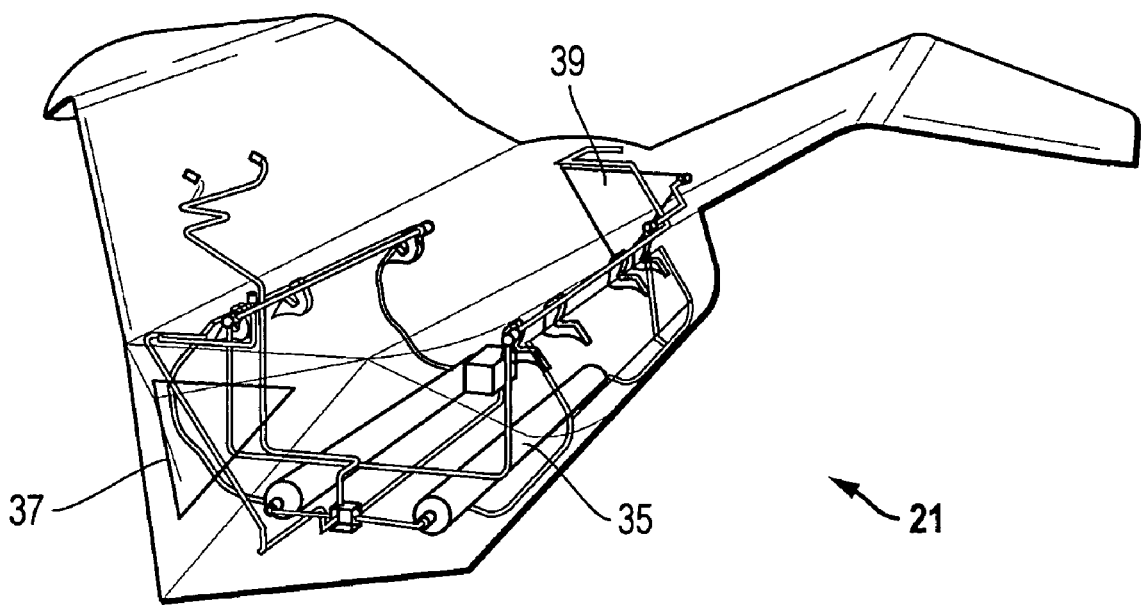
FIG. 8 is a diagram of the aircraft of FIG. 1 illustrating an internal gas pressurization system to offset/balance external hydrostatic water pressure loads.

The aircraft 21 is configurable in a watertight configuration for immersion and buoyancy in sea water (FIG. 3). The aircraft 21 also has a flight configuration (FIGS. 1 and 2) for operational use. The aircraft 21 utilizes rockets 33 (two shown in FIGS. 4 and 5) that are detachably mounted to the body 23. The rockets 33 provide lift-off for a sea-based launch (FIG. 3) from at least a partially submerged position. The rockets 33 are disposable after launch (FIG. 5), but the aircraft 21 itself and body 23 are reusable after flight with the jet engine 27.

Figure 9:
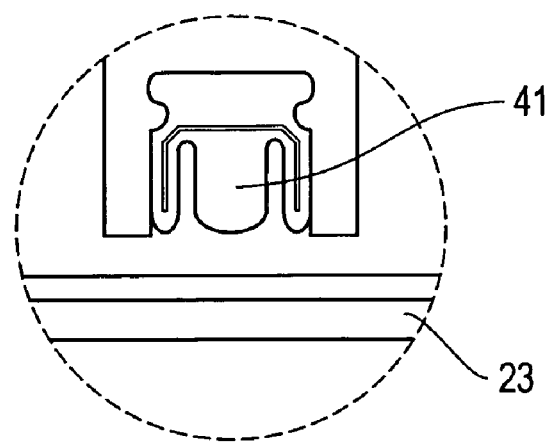
FIG. 9 is a sectional side view of an inflatable seal for the jet engine inlet aperture of the aircraft of FIG. 1.
Figure 10:
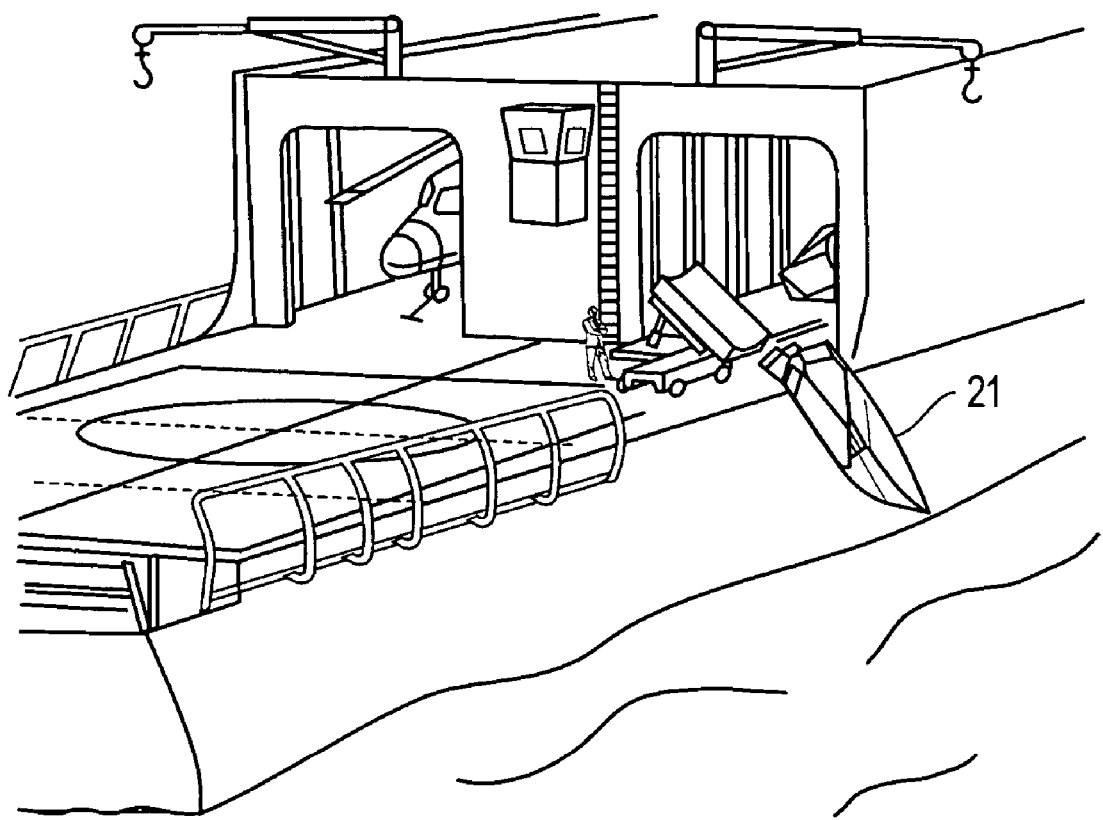
FIG. 10 is a diagram of one embodiment of a launch and retrieval ship for the aircraft of FIG. 1.

After completing a mission, the aircraft 21 is also designed to make a splashdown landing directly in a body of water (FIGS. 6–7), such as with a parachute 34. As such, the aircraft 21 has no conventional landing gear or floatation pontoons. The aircraft 21 is equipped with an internal gas pressurization system 35 (FIG. 8) to offset and balance external hydrostatic water pressure loads when the aircraft 21 is in the water. In addition, the jet engine 27 has inlet and nozzle close-off doors 37, 39 with inflatable watertight seals 41 (FIG. 9). Similarly, the body 23 has actuated doors, which each utilize watertight inflatable seals, and manufacturing joints, seams, and airframe penetrations that require sealant 44 (FIG. 13), such as silicon sealant, and/or appliqué tapes 42 for enabling the watertight configuration.

Furthermore, the aircraft 21 is provided with a filler material 46 (FIG. 14), such as syntactic foam, to fill selected voids 48 of the aircraft 21. The syntactic foam 46 provides structural strength (i.e., resists hydrostatic loads at-depth) to areas of the aircraft 21 that are not readily infused with nitrogen gas (e.g., from pressurization system 35), and/or for those areas expected to experience the highest impact loads during splashdown. The foam 46 also makes those filled areas/volumes 48 inherently watertight.

Figure 11:
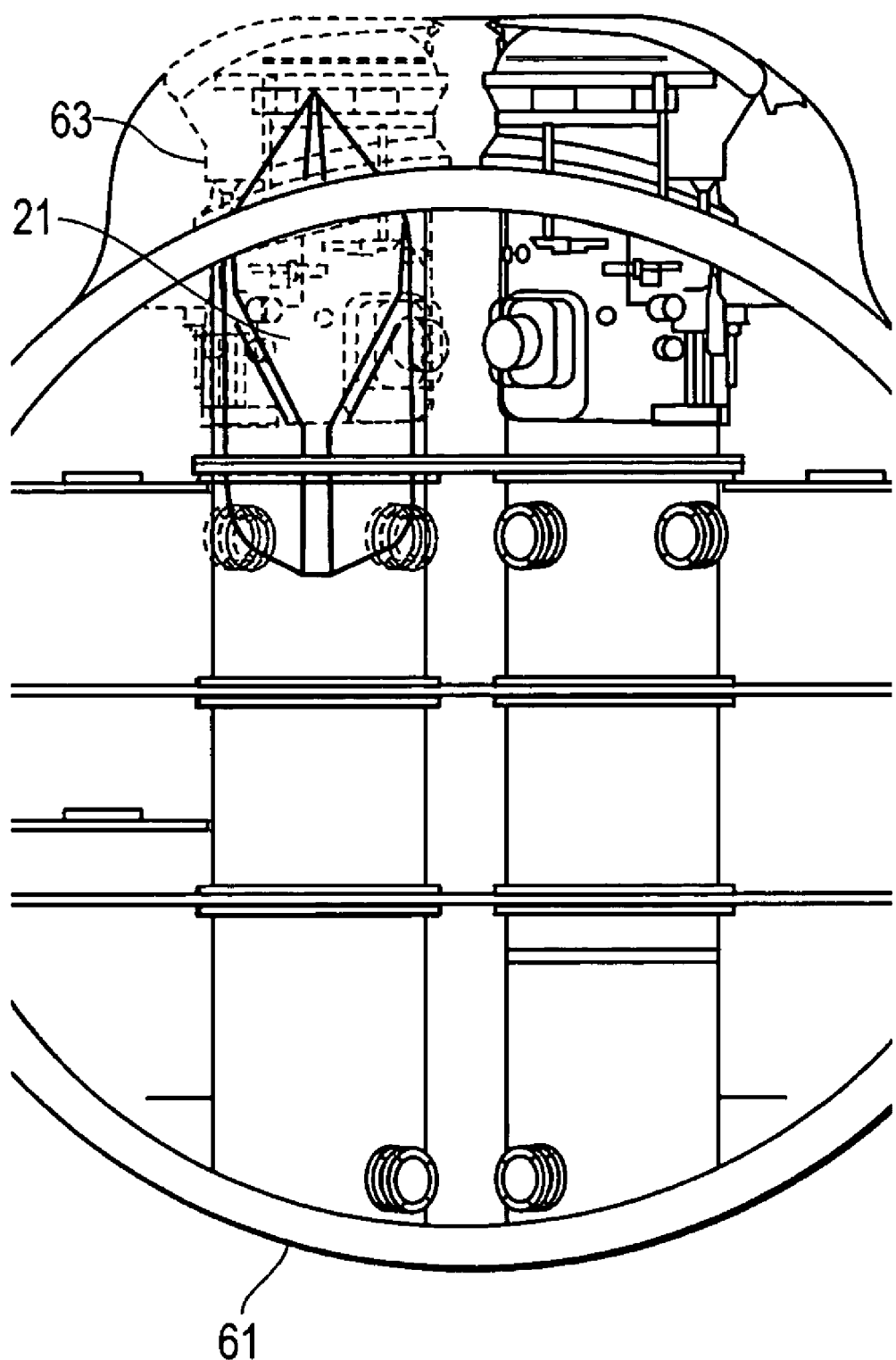
FIG. 11 is a diagram of another embodiment of a launch and retrieval ship for the aircraft of FIG. 1.
Figure 12:
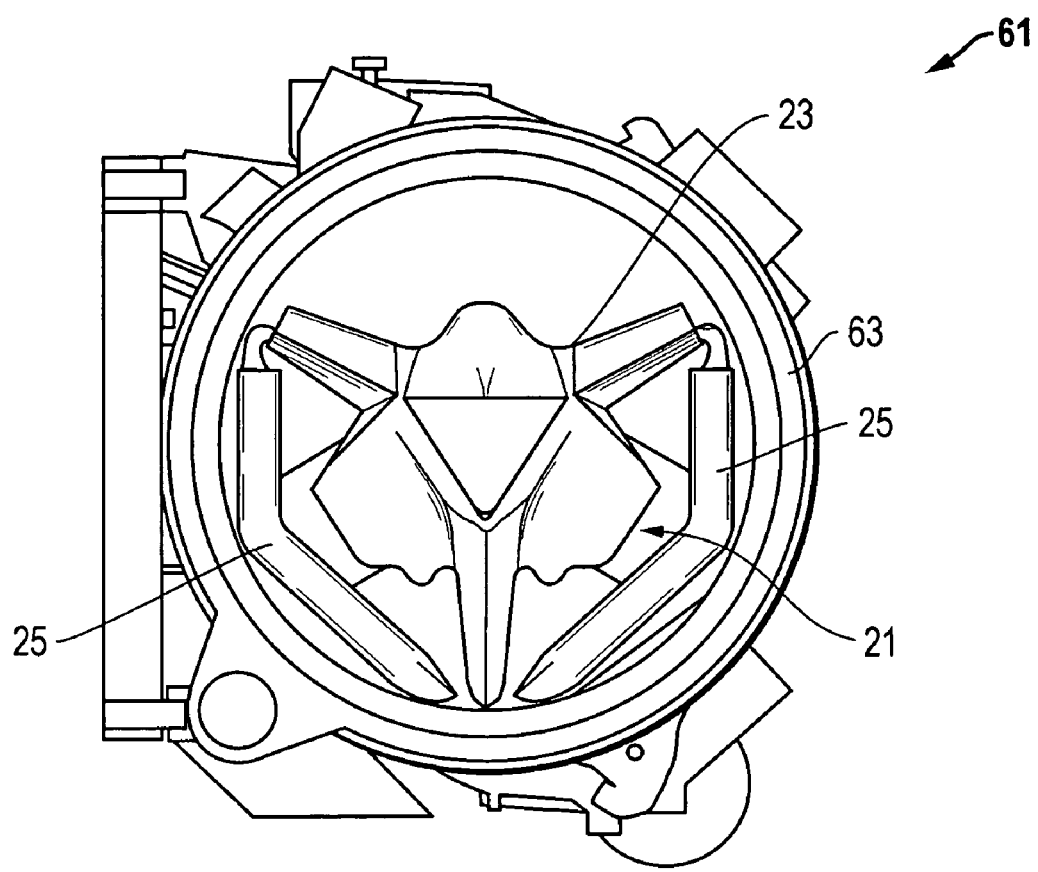
FIG. 12 is a top view of a storage position for the aircraft of FIG. 1 in the ship of FIG. 11.
Figure 13:
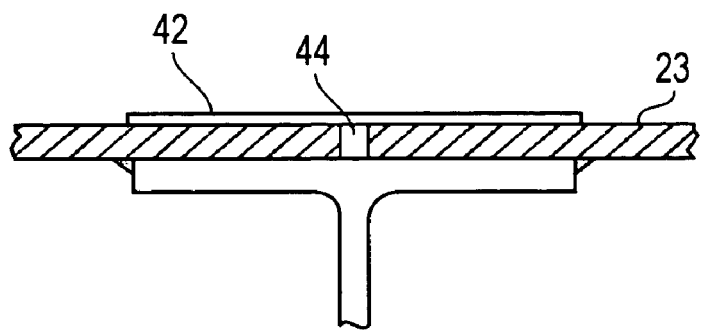
FIG. 13 is a sectional diagram illustrating one embodiment of watertight treatments for typical external manufacturing seams of the aircraft of FIG. 1.
Figure 14:
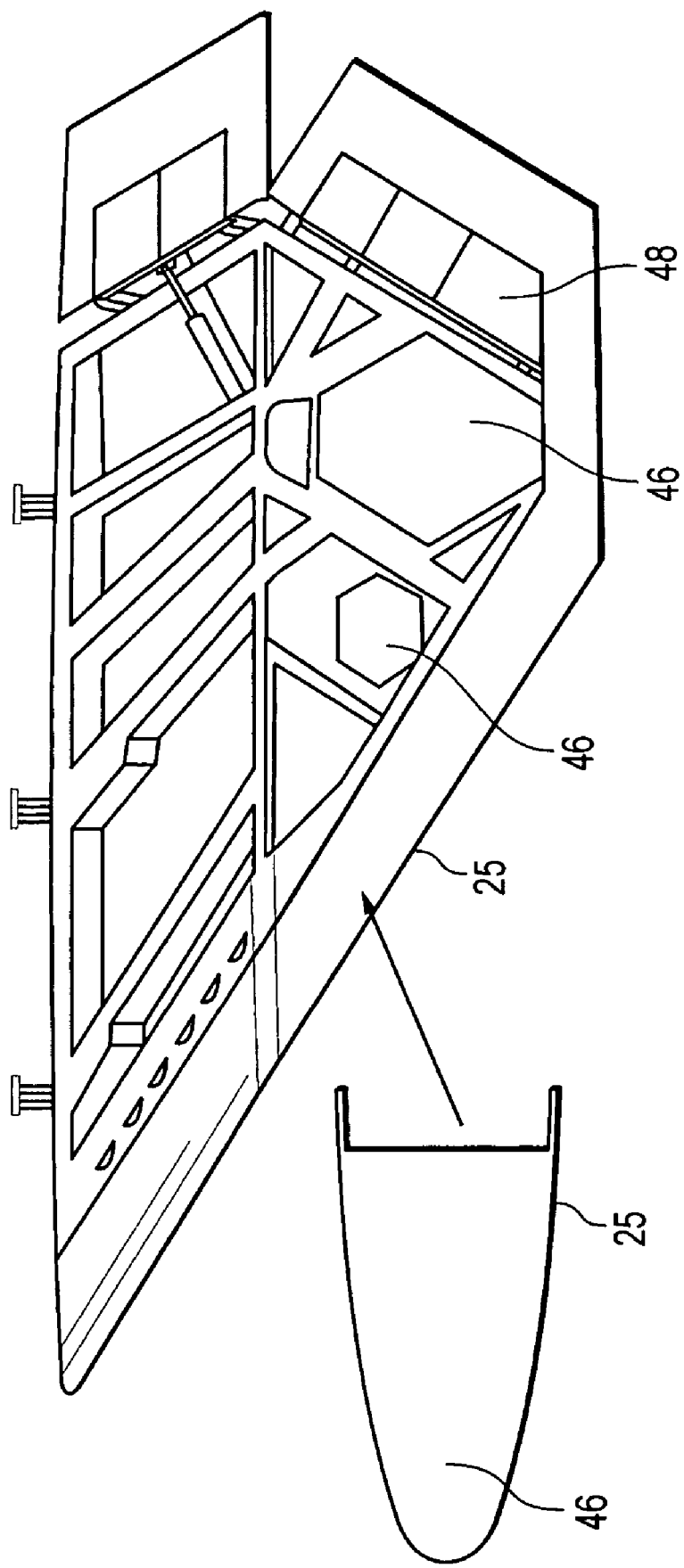
FIG. 14 is a sectional diagram illustrating one embodiment of watertight treatments for various voids within the interior of the aircraft of FIG. 1.

The present invention also comprises a system for operating a sea-based aircraft without the need for a flight deck (FIGS. 3 and 10–12). One embodiment of the system comprises a submarine 61 having a converted missile tube 63 (FIG. 11). The aircraft 21 is storable in, deployable from, and retrievable to the missile tube 63 of the submarine 61 while the submarine 61 is submerged (FIG. 3). As described above, the aircraft 21 has a jet engine 27, a payload 31, a watertight configuration such that the aircraft is impermeable to water, and a flying configuration for operation of the jet engine 27.

The aircraft 21 is preferably unmanned, and the aircraft 21 is deployed from the submerged submarine 61 into a body of water. The aircraft 21 is at least partially submerged in the body of water when beginning flight. The aircraft 21 is propelled out of the body of water with rocket boosters 33 and sustains flight with the jet engine 27. The aircraft 21 may utilize the payload 31 to attack a target with munitions 29 (FIG. 2) and/or provide reconnaissance.

Since the aircraft 21 is entirely sea-based, it has no landing gear and lands directly in a body of water. However, the aircraft 21 shuts down the jet engine 27 and provides a watertight seal for the jet engine inlet and nozzle 37, 39 before splashing down and being recovered by the submerged submarine 61. The aircraft 21 is reusable after being refueled and refitted with payload 29 if necessary. The wings 25 of the aircraft 21 are unfolded from a retracted storage position (FIG. 12) to an extended flying position (FIG. 1) prior to flight, and the wings 25 are folded from the extended flying position to the retracted storage position prior to storage.

The present invention also comprises a method of operating a sea-based aircraft 21. One embodiment of the method comprises equipping an aircraft 21 with a payload 29, configuring the aircraft 21 in a watertight configuration, and storing the aircraft on a ship 61 (FIGS. 10–11), e.g., in a converted missile tube of a submerged submarine. When the aircraft 21 is ready to be used, the method comprises releasing the aircraft 21 into a body of water such that the aircraft 21 is at least partially submerged in the body of water, and then propelling the aircraft 21 out of the body of water, e.g., with rockets 33. The wings 25 are unfolded from a retracted storage position to an extended flying position to fly the airplane 21, and the wings are folded from the extended flying position to the retracted storage position to retrieve the airplane 21.

The method then comprises sustaining flight of the aircraft 21 with a jet engine 27, utilizing the payload 29 of the aircraft 21, returning or landing the aircraft 21 in the body of water, and retrieving the aircraft 21 onto the ship 61 (e.g., into the converted missile tube of the submerged submarine 61). The method further comprises refitting the aircraft 21 (FIG. 11) with another payload 29 (if needed) and repeating the aforementioned steps. The method still further comprises returning the aircraft 21 to a designated recovery point in the body of water, shutting down the jet engine 27, and putting the aircraft 21 in the watertight configuration prior to reentering (i.e., splashing down directly into) the body of water. The method may comprise attacking a target with munitions and/or providing reconnaissance.

While the invention has been shown or described in only some of its forms, it should be apparent to those skilled in the art that it is not so limited, but is susceptible to various changes without departing from the scope of the invention.

What is claimed is:

1. A method of operating a sea-based aircraft, comprising:
    (a) equipping an aircraft with a payload and without landing gear or flotation pontoons;
    (b) configuring the aircraft itself in a watertight configuration;
    (c) storing the aircraft on a ship;
    (d) releasing the aircraft into a body of water such that the aircraft is at least partially submerged in the body of water;
    (e) propelling the aircraft out of the body of water;
    (f) sustaining flight of the aircraft with a jet engine;
    (g) utilizing the payload of the aircraft;
    (h) landing the aircraft in the body of water; and
    (i) retrieving the aircraft onto the ship.

2. The method of claim 1, further comprising refitting the aircraft with another payload and repeating steps (b) through (i).

3. The method of claim 1, further comprising shutting the aircraft to a designated recovery point in the body of water and shutting down the jet engine prior to step (h).

4. The method of claim 1, wherein step (b) is repeated before step (h).

5. The method of claim 1, wherein step (h) comprises splashing down directly into the body of water.

6. The method of claim 1, wherein step (e) comprises using rocket boosters.

7. The method of claim 1, wherein step (g) comprises attacking a target with munitions and providing reconnaissance.

8. The method of claim 1, wherein step (d) comprises unfolding wings of the aircraft from a retracted storage position to an extended flying position, and step (i) comprises folding the wings from the extended flying position to the retracted storage position.

9. The method of claim 1, wherein steps (c) and (i) comprise using a submerged submarine.

10. The method of claim 9, wherein the aircraft is released from and retrieved into a converted missile tube in the submarine.

11. The method of claim 1, further comprising internally pressurizing the aircraft to offset and balance external hydrostatic water pressure loads, operating inlet and nozzle close-off doors with inflatable watertight seals to make the jet engine watertight, treating manufacturing joints, seams, and airframe penetrations with sealant and appliqué tapes for further enabling the watertight configuration.

12. The method of claim 1, wherein steps (h) and (i) comprise shutting down the jet engine and enabling the watertight configuration for the jet engine before being recovered by a submerged submarine.

13. A method of operating a sea-based aircraft, comprising:
    (a) equipping an aircraft with a payload;
    (b) configuring the aircraft itself in a watertight configuration;
    (c) storing the aircraft on a ship;
    (d) releasing the aircraft into a body of water such that the aircraft is at least partially submerged in the body of water;
    (e) unfolding wings of the aircraft from a retracted storage position to an extended flying position while the aircraft is at least partially submerged in the body of water;
    (f) propelling the aircraft out of the body of water with rocket boosters;
    (g) sustaining flight of the aircraft with a jet engine;
    (h) utilizing the payload of the aircraft;
    (i) returning the aircraft to a designated recovery point in the body of water and reconfiguring the aircraft in a watertight configuration during flight prior to a splash-down;
    (j) splashing down directly into the body of water; and
    (k) retrieving the aircraft onto the ship.

14. The method of claim 13, further comprising refitting the aircraft with another payload and repeating steps (b) through (k).

15. The method of claim 13, wherein step (h) comprises attacking a target with munitions and providing reconnaissance.

16. The method of claim 13, wherein steps (c) and (k) comprise using a submerged submarine, the aircraft is released from and retrieved into a converted missile tube in the submarine, and the wings from in the retracted storage position during steps (c) and (k).

17. The method of claim 13, further comprising equipping the aircraft without landing gear or flotation pontoons.

18. The method of claim 13, wherein step (b) comprises internally pressurizing the aircraft to offset and balance external hydrostatic water pressure loads, operating inlet and nozzle close-off doors with inflatable watertight seals to make the jet engine watertight, treating manufacturing joints, seams, and airframe penetrations with sealant and appliqué tapes for further enabling the watertight configuration.

19. The method of claim 13, wherein step (i) comprises shutting down the jet engine and enabling the watertight configuration for the jet engine prior to splashdown and before being recovered by a submerged submarine.

20. A method of operating a sea-based aircraft, comprising:
   (a) equipping an aircraft with a payload;
   (b) configuring the aircraft itself in a watertight configuration;
   (c) storing the aircraft on a ship;
   (d) releasing the aircraft into a body of water such that the aircraft is at least partially submerged in the body of water;
   (e) propelling the aircraft out of the body of water;
   (f) sustaining flight of the aircraft with a jet engine;
   (g) utilizing the payload of the aircraft;
   (h) landing the aircraft in the body of water;
   (i) retrieving the aircraft onto the ship; and
   (j) internally pressurizing the aircraft to offset and balance external hydrostatic water pressure loads, operating inlet and nozzle close-off doors with inflatable watertight seals to make the jet engine watertight, treating manufacturing joints, seams, and airframe penetrations with sealant and appliqué tapes for further enabling the watertight configuration.

* * * * *